United States Patent [19]
Fielding et al.

[11] 4,165,309
[45] Aug. 21, 1979

[54] FLAME RETARDANT POLYMER COMPOSITION

[75] Inventors: Ivor R. Fielding, Naperville; Wassily Poppe, Lombard; Francis J. Slama, Aurora, all of Ill.

[73] Assignee: Standard Oil Company (Indiana), Chicago, Ill.

[21] Appl. No.: 949,655

[22] Filed: Oct. 10, 1978

[51] Int. Cl.² .......................... C08K 5/02; C08K 5/03; C08K 5/09; C08K 3/32
[52] U.S. Cl. .......................... 260/45.8 A; 260/45.9 E; 260/45.9 NP
[58] Field of Search ................ 260/45.9 E, 45.9 NP, 260/45.7 RL, 45.8 A; 252/8.1; 428/921

[56] References Cited

U.S. PATENT DOCUMENTS

| | | | |
|---|---|---|---|
| 2,491,443 | 12/1949 | Cox et al. | 260/45.9 E |
| 2,491,444 | 12/1949 | Cox et al. | 260/45.9 E |
| 3,210,321 | 10/1965 | Doyle et al. | 260/45.9 E |
| 3,427,278 | 2/1969 | Siuta | 260/45.9 E |
| 3,819,518 | 6/1974 | Endler | 428/921 |
| 3,972,820 | 8/1976 | Filter et al. | 428/921 |

*Primary Examiner*—Veronica P. Hoke
*Attorney, Agent, or Firm*—William H. Magidson; Arthur G. Gilkes; William T. McClain

[57] ABSTRACT

This invention relates to flame resistant resinous polymer compositions. More particularly, this invention relates to flame resistant compositions comprising a resinous thermoplastic polymer, ammonium nitrate, ammonium polyphosphate and a chlorine or bromine containing organic compound.

7 Claims, No Drawings

FLAME RETARDANT POLYMER COMPOSITION

Due to the increased use of thermoplastics in fabricated products and building applications, it has become necessary to reduce the flammability of these products. At the present time, lack of adequate fire retardancy is one of the principal barriers to opening of additional large markets for these materials. In addition, the increased cost resulting from the incorporation of more fire retardants along with the frequent deterioration of physical properties of the polymer have been additional barriers to commercial acceptance.

A number of test methods have been devised to measure flammability. A partial list of the most common methods is given in J. W. Lyons, *The Chemistry and Uses of Fire Retardants*, Wiley-Interscience, p. 3-14 (1970) incorporated by reference herein.

One of the most common methods is the Oxygen Index Test (O.I.), ASTM D-2863-70. The oxygen index is defined as the minimum concentration of oxygen (volume percent) in an atmosphere of oxygen and nitrogen which is needed to sustain the candle-like burning of a stick of polymer. The oxygen indexes for various materials are given in Lyons, p. 7 and 8.

The oxygen index gives information about the intrinsic flammability of a material but very little about its role in propagating a fire from one place to another. The Underwriters Laboratories' Test 94 does provide such information.

In the UL94 test, samples are tested in two configurations. In one case the samples are clamped in a vertical position and ignited at the bottom of the test piece. In the second configuration, triplicate samples are tested in a horizontal position. Specific requirements as described hereinafter must be met to classify the composition as UL94V-2.

Various processes for increasing the flame resistance of resinous polymers are described in Lyons. Among the most common additives are halogenated compounds that can decompose in the presence of heat to form the corresponding hydrogen halide. Examples of such halogenated compounds are chlorinated paraffin waxes containing 40% to 75% chlorine; tetrachlorophthalic anhydride; and tertrabromophthalic anhydride. To achieve a satisfactory level of flame resistance, a large amount of the halogenated compound, generally greater than 30 parts by weight per 100 parts of the polymer, is required.

The quantity of halogenated compound required can be reduced by adding another component such as antimony trioxide. However, the total additive amount (antimony compound and halogenated compound) still ordinarily ranges from 15-30 parts by weight per 100 parts by weight of the polymer. This can cause a deterioration of the polymer's mechanical properties such as yield strength, breaking load and hardness. Additionally, the cost of the antimony trioxide (about $1.70 per pound) adds significantly to the cost of the polymeric composition. Accordingly there is a need for new fire retardant compositions which contain lower levels of flame retardant agents and/or have a lower cost.

Ammonium polyphosphate has been used in conjunction with chlorinated wax in intumescent print formulations (W. C. Kuryla and A. J. Papa, editors, *Flame Retardancy of Polymeric Materials*, Vo. 1, Marcel Dekker, New York, 1973, pp. 267-9). Certain materials have been reported to act as synergists with ammonium polyphosphate. For example, polypropylene containing either 20% ammonium polyphosphate or 10% polyphosphonium bromide is classed as free burning by ASTM D-635. Murry and Savides in U.S. Pat. No. 3,649,591 report that a self-extinguishing blend results when 5% of each additive is combined with the resin. Additionally, polypropylene containing 10-15% ammonium polyphosphate and 8-10% poly(phosphine oxide) is reported by Hoffman in U.S. Pat. No. 3,835,119 to pass the UL94 test. The present cost of ammonium polyphosphate is about $1.12 per pound.

Although numerous compounds are known to be flame retardants, this is an emperical area since flame retardants useful in some polymers have little or no effect in others. For example, Taylor and Lutz in U.S. Pat. No. 3,325,563 and U.S. Pat. No. 3,412,052 report that polypropylene and polybutene can be rendered self-extinguishing with 4 weight percent of bis(bromochloropropyl)bromochloropropylphosphonate whereas polyethylene with 4 weight percent of the additive burns faster than an untreated control. Further, it has been difficult to predict the interaction of two or more flame retardants. For example in Lyons, p. 321, it is reported that polystyrene may be made self-extinguishing by using 5 weight percent tris(2,3-dibromopropyl) phosphate which corresponds to 0.22 weight percent phosphorus and 3.5 weight percent bromine. When antimony trioxide is used it is reported in Lyons p. 328 that 0.5 weight percent phosphorus, 7-8 weight percent bromine and 6-8 weight percent antimony trioxide are required to render polystyrene self-extinguishing.

The general object of this invention is to provide flame resistant resinous compositions. A more specific object is to provide resinous compositions which meet the UL94V-2 specifications. Other objects appear hereinafter.

We have found that the objects of this invention can be accomplished by a composition comprising a resinous thermoplastic polymer selected from a group consisting of a resinous polymer of propylene, a resinous polymer of styrene or a resinous poly(alkylene terephthalate); ammonium nitrate; ammonium polyphosphate and a primary flame retardant agent comprising a chlorine or bromine containing organic compound.

To satisfy the requirements for a UL94V-2 rating, the ammonium polyphosphate, ammonium nitrate and the primary flame retardant agent must all be present in the resinous composition. When ammonium polyphosphate is not present, the oxygen indexes of the resinous compositions can be increased but the UL94V-2 horizontal burn test or flame time requirements are not met. Such resinous compositions containing ammonium nitrate and the primary flame retardant agent are disclosed and claimed in Ser. No. 949,654 filed on even date. If ammonium nitrate is not present, the resinous compositions do not pass the UL94 horizontal burn test even though the oxygen indexes are increased by the presence of ammonium polyphosphate and the primary flame retardant agent. Not all resinous compositions meet the UL94V-2 specifications even though ammonium nitrate, ammonium polyphosphate and the primary flame retardant agent are all present. For example, high density polyethylene compositions did not meet the requirements for a UL94V-2 rating.

The resinous thermoplastic polymers useful in this invention include: substantially crystalline homopolymeric polypropylene; block, random, or multi-segment copolymers of propylene containing at least 75 percent by weight propylene and up to 25 percent by weight of another alpha olefin, such as ethylene or 1-butene; homopolystyrene and copolymers of styrene containing up to 20 percent by weight of an ethylenically unsaturated monomer such as acrylonitrile, butadiene, α-methylstyrene, methylacrylate or maleic anhydride; rubber-modified polystyrene which can be prepared by dispersing into the polystyrene up to about 15 percent by weight of a rubber phase such as polybutadiene, or styrene-butadiene copolymer; poly(alkylene terephthalates) such as homopolymeric poly(ethylene terephthalate) and homopolymeric poly(butylene terephthalate) and copolymeric poly(alkylene terephthalates) containing up to 20 percent by weight of the terephthalic acid moiety replaced with isophthalic acid moiety. The resinous polymer comprises at least 50 weight percent of the resinous composition.

The resinous polymer affects the concentrations of the flame retardant components which must be present in the resinous composition for a UL94V-2 rating. Other things being equal, polystyrene and poly (butylene terephthalate) require higher levels of the flame retardant components than polypropylene.

The primary flame retardant agents useful in the resinous compositions of this invention are the chlorine or bromine containing organic compounds listed in Lyons, pages 76 through 101, incorporated by reference herein. Typically, these compounds are substantially non-volatile at the melting point of the resinous composition. Such compounds usually have a molecular weight above 200, and contain 35–95 percent by weight halogen. These include decarbromophenoxybenzene, tetrabromobisphenol A, hexabromocyclododecane and tetrabromophthalic anhydride. The peferred primary fire retardant agent useful in the instant invention is tetrabromophthalic anhydride. Although the level of the primary flame retardant agent required to provide the resinous composition a UL94V-2 rating depends on the resinous polymer and the concentrations of the ammonium polyphosphate and ammonium nitrate, ordinarily the primary flame retardant comprises about 5 to 20 weight percent of the resinous composition. The optimum level for a particular resin can be determined by routine experimentation. The term weight percent as used herein is defined as the parts by weight of the component per 100 parts of the total resinous composition.

In order to produce a UL94V-2 rated resinous composition, the ammonium polyphosphate is ordinarily present in concentrations ranging from about 0.5 to 10 weight percent. The optimum concentration depends on the other components in the resinous composition. Other things being equal, a lower level of ammonium polyphosphate can be used when the concentration of the primary flame retardant or the ammonium nitrate is increased. Excessive concentrations of ammonium polyphosphate increase the expense of the resinous composition and can also have a detrimental effect on the physical properties of the resinous composition. Insufficient ammonium polyphosphate produces a resinous composition which does not meet the UL94V-2 specifications. Ammonium dihydrogen phosphate, when used in place of ammonium polyphosphate, can give a similar oxygen index value but the compositions do not meet the UL94V-2 test requirements. Additionally, ammonium phosphate and ammonium dihydrogen phosphate cannot be used due to the lower decomposition temperature of the latter two compounds since a high decomposition temperature is required to allow the resinous composition to be extruded.

Ordinarily the concentration of ammonium nitrate required to produce a UL94V-2 rated resinous composition can range from about 0.2 to about 3 weight percent. The concentration can vary depending upon the resinous polymer and the other components in the resinous composition. Other things being equal, less ammonium nitrate is required if the levels of ammonium polyphosphate and the primary flame retardant are increased. Excessive ammonium nitrate can cause difficulties in extruding the resinous composition. Although other nitrates such as $KNO_3$ and $NaNO_3$ were tested, our experiments indicate these were not effective in producing a UL94V-2 rating.

The resinous composition can also contain inert fillers such as calcium carbonate, talc, glass fiber and other materials well known in the art. Stabilizers such as 2,6-di-tert-butyl-p-cresol and 2,4-dihydrobenzophenone can be added to increase the resistance of the composition to degradation due to ultra-violet radiation and oxidation. The composition, however, must contain at least 50 weight percent of the resinous polymer to maintain the desired physical properties.

The UL94 test consists of two parts, a vertical burn test and a horizional burn test. For the vertical burn test, two sets of specimens are prepared with each set consisting of five bars. Each bar is injection molded as described hereinafter with the following dimensions: length, 5 inches; width, 0.5 inch; thickness, 0.125 inch. One set of bars is aged 24 hours at 23° C. and 50 percent relative humdity. The other set is aged 168 hours at 70° C. and then cooled in a desiccator over anhydrous calcium chloride for at least four hours at room temperature. Each specimen is clamped in a vertical position and ignited at the bottom of the test piece. The test flame is held below the specimen for 10 seconds and removed. After specimen burning has ceased, the test flame is held under the specimen for another 10 seconds and removed. The material must meet the following specifications in this burning configuration to be classed as UL94V-2;

1. no specimen can burn more than 30 seconds following each 10 second ignition;
2. the total combustion time for 10 flame applications to 5 specimens cannot exceed 250 seconds;
3. no specimen can burn completely;
4. specimens which drip flaming particles are allowed;
5. glowing combustion cannot persist beyond 60 seconds nor ignite cotton beyond 30 seconds after removal of the second flame.

The values reported in the tables hereinafter for the vertical burn test are averages of the values obtained with the five bars of each set.

In the horizontal burn test, a set of three bars is aged 24 hours at 23° C. and 50 percent relative humdity. These bars are tested in a horizontal position with a 20 mesh wire gauze placed horizontally ⅜ inch below the bottom edge of the bar. The bars are positioned so that the flat surface of the bar is at a 45° angle to the wire screen. A flame is applied for 30 seconds without changing the position of the burner. The flame front is timed as it proceeds from a one inch to a four inch mark from the leading end of the bar. If the bar burns past the mark at a rate less than 1.5 inches per minute, it is classified as 94-HB. However to meet the UL94-V-2 specifications, none of the bars can burn past the four inch mark.

The following examples are merely illustrative and should not be construed as limiting the scope of the invention.

EXAMPLE I

This example illustrates the preparation of compositions containing polypropylene which are classified as UL94V2. The compositions were prepared by weighing out the polypropylene, stabilizers, and flame retardants in the concentration set forth in Table I and thoroughly mixed in a Waring blender. The resulting blend was extruded without difficulty on a one-inch pelletizing, screw extruder having a ⅛-inch strand die maintained at 400°–425° F. This extrudate was used to mold the test bars on a Frohring mini-jector at 400°–425° F.

The polypropylene resin used was a powder having a weight average molecular weight of approximately 450,000 as determined by gel permeation chromatography and a flow rate of 2–4 grams per 10 minutes as determined per ASTM D-1238 following procedure A and condition L.

The following stabilizers were used: BHT is butylated hydroxytoluene. Argus Q328 is a mixture of distearyl thiodipropionate and the three to one condensate of 3-methyl-6-tertiary-butyl phenol with crotonaldehyde. Epon 1002 is an epoxy resin having a melting point of from 75° to 85° C. and an epoxide equivalent, in grams of resin containing one gram equivalent epoxy, of 600 to 700. The stabilizers were combined with the base polymer in the following parts by weight per 100 parts of the total composition: 0.10 BHT; 0.36 Argus Q328; 0.15 Epon 1002; 0.15 calcium stearate.

Phos Chek P/30 is ammonium polyphosphate.

The oxygen index was determined according to the procedure of ASTM D-2863-70 using the specimen bars injection molded as described above with the following dimensions: length, 4.5 inches; width, 0.256 inch; thickness, 0.118 inch. The results are expressed as the minimum percent oxygen in an atmosphere of oxygen and nitrogen needed to sustain candle-like burning of the specimen bar.

The UL94 test results and oxygen index values for the compositions are given in Table I.

Table I

| Composition[a] | | | | | | |
|---|---|---|---|---|---|---|
| PP | 87.2 | 85.2 | 87 | 86.8 | 86.6 | 86.2 |
| TBPA | 10 | 10 | 10 | 10 | 10 | 10 |
| APP | 2 | 4 | 2 | 2 | 2 | 2 |
| $NH_4NO_3$ | — | — | 0.2 | 0.4 | 0.6 | 1 |
| 48 hrs. @23° C.[b] | | | | | | |
| Avg. Flame Time (sec.) | | | | | | |
| First Ignition | 21 | 9 | 2 | 2 | 2 | 3 |
| Second Ignition | 4 | 2 | 1 | 3 | 2 | 1 |
| Glow Time (sec.) | 0 | 0 | 0 | 0 | 0 | 0 |
| Horizontal Burn | Fail | Fail | Pass | Pass | Pass | Pass |
| 168 hrs. @70° C.[b] | | | | | | |
| Avg. Flame Time (sec.) | | | | | | |
| First Ignition | 25 | 8 | 5 | 5 | 1 | 2 |
| Second Ignition | 4 | 2 | 3 | 2 | 1 | 2 |
| Glow Time (sec.) | 0 | 0 | 0 | 0 | 0 | 0 |
| Rating | UL94-HB | UL94-HB | UL94V-2 | UL94V-2 | UL94V-2 | UL94V-2 |
| Oxygen Index | 26.5 | 26.5 | 26.5 | 27.7 | 26.5 | 27.9 |

[a]Values are weight percent based on total composition; PP is polypropylene; TBPA is tetrabromophthalic anhydride; APP is ammonium polyphosphate; stabilizers total 0.76 weight percent.
[b]Conditions for aging specimen bars.

As shown in Table I, the composition containing polypropylene, 10 weight percent tetrabromophthalic anhydride and two weight percent ammonium polyphosphate, did not meet the UL94V-2 specifications for two reasons—excessive flame time and horizontal burning. Increasing the ammonium polyphosphate concentration from two to four weight percent reduced the flame time but did not aid in passing the horizontal burn test. Only the compositions containing ammonium nitrate had a reduced flame time and passed the horizontal burn test. As shown in Table I only 0.2 weight percent ammonium nitrate was required to allow the composition to pass the horizontal burn test and be classified as UL94V-2.

EXAMPLE II

This example illustrates the effect different levels of ammonium polyphosphate have on the UL94 test with polypropylene compositions. The procedure and materials of Example I were used to prepare and test the compositions shown in Table II.

Table II

| Composition* | | | | | | |
|---|---|---|---|---|---|---|
| PP | 87.2 | 88.5 | 88 | 88.1 | 87.1 | 87 |
| TBPA | 10 | 10 | 10 | 10 | 10 | 10 |
| APP | 2 | 0.5 | 1 | 1 | 2 | 2 |
| $NH_4NO_3$ | — | 0.2 | 0.2 | 0.1 | 0.1 | 0.2 |
| Horizontal Burn | Fail | Fail | Fail | Fail | Fail | Pass |
| Rating | UL94-HB | UL94-HB | UL94-HB | UL94-HB | UL94-HB | UL94V-2 |
| Oxygen Index | 26.5 | 27.1 | 26.5 | 24.5 | 25.5 | 26.5 |

*Values are weight percent based on total composition; PP is polypropylene, TBPA is tetrabromophthalic anhydride; APP is ammonium polyphosphate; stabilizers total 0.76 weight percent.

The results in Table II show that other things being equal there is a minimum concentration of ammonium polyphosphate required and ammonium nitrate must be present for the polypropylene composition to pass the horizontal burn test. Although the composition containing 0.5 weight percent ammonium polyphosphate and 0.2 weight percent ammonium nitrate had a high oxygen index of 27.1, it failed the horizontal burn test. A composition containing 2 weight percent ammonium polyphosphate and 0.2 weight percent ammonium nitrate did pass the horizontal burn test and was classified UL94V-2. When the sample did not pass the horizontal burn test, the flame times were not determined. The full test results for the composition that was rated UL94V-2 are given in Table I.

EXAMPLE III

This example illustrates that polypropylene compositions containing sodium nitrate in place of ammonium nitrate failed the horizontal burn test. The procedure and materials of Example I were used to prepare and test the compositions shown in Table III.

EXAMPLE IV

This sample illustrates the test results obtained with compositions containing polystyrene as the resinous component. The procedure and materials of Example I were used to prepare the compositions except polystyrene resin was used in place of the polypropylene. The crystal polystyrene used had a flow rate of 3.5 grams per 10 minutes as determined by ASTM D-1238 condition G.

Table IV

| Composition[a] | | | | | | | |
|---|---|---|---|---|---|---|---|
| PS | 99.2 | 89.2 | 97.2 | 87.2 | 87 | 80.9 | 74.8 |
| TBPA | — | 10 | — | 10 | 10 | 15 | 20 |
| APP | — | — | 2 | 2 | 2 | 3 | 4 |
| $NH_4NO_3$ | — | — | — | — | 0.2 | 0.3 | 0.4 |
| Results after 48 hrs. @23° C.[b] | | | | | | | |
| Avg. Flame Time (sec.) | | | | | | | |
| First Ignition | >30 | >30 | >30 | >30 | 15 | | 5 |
| Second Ignition | | | | | 4 | | 2 |
| Glow Time (sec.) | | | | | 0 | | 0 |
| Horizontal Burn | | | | | Fail | Fail | Pass |
| Results after 168 hrs. @70° C.[b] | | | | | | | |
| Avg. Flame Time (sec.) | | | | | | | |
| First Ignition | | | | | | | 2 |
| Second Ignition | | | | | | | 2 |
| Glow Time (sec.) | | | | | | | 0 |
| Rating | UL94-HB | UL94-HB | UL94-HB | UL94-HB | UL94-HB | UL94-HB | UL94 V-2 |

[a] Values are weight percent based on total composition; PS is polystyrene; TBPA is tetrabromophthalic anhydride; APP is ammonium polyphosphate; stabilizers total 0.76 weight percent.
[b] Conditions for aging specimen bars.

As can be seen by comparing Table I with Table IV, 0.2 weight percent ammonium nitrate, 2 weight percent ammonium polyphosphate and 10 weight percent tetrabromophthalic anhydride which gave a UL94V-2 rating with polypropylene only produced a UL94-HB rating with polystyrene. It was necessary to increase the concentration of these components to give a polystyrene composition with a UL94V-2 rating. Whenever the specimens aged 48 hours at 23° C. failed either the flame time or horizontal burn test, the specimens aged Table III

| Composition[a] | | | | | | |
|---|---|---|---|---|---|---|
| PP | 87.2 | 87 | 86.8 | 86.6 | 86.4 | 86.2 |
| TBPA | 10 | 10 | 10 | 10 | 10 | 10 |
| APP | 2 | 2 | 2 | 2 | 2 | 2 |
| $NaNO_3$ | — | 0.2 | 0.4 | 0.6 | 0.8 | 1 |
| 48 hrs. @23° C.[b] | | | | | | |
| Avg. Flame Time (sec.) | | | | | | |
| First Ignition | >30 | 16 | 16 | 15 | 7 | 10 |
| Second Ignition | — | 8 | 4 | 3 | 4 | 3 |
| Glow Time (sec.) | — | 0 | 0 | 0 | 0 | 0 |
| Horizontal Burn | Fail | Fail | Fail | Fail | Fail | Fail |
| Rating | UL94-HB | UL94-HB | UL94-HB | UL94-HB | UL94-HB | UL94-HB |
| Oxygen Index | 26.5 | 26.5 | 26.1 | 28.9 | 27.9 | 29.4 |

[a] Values are weight percent based on total composition; PP is polypropylene; TBPA is tetrabromophthalic anhydride; APP is ammonium polyphosphate; stabilizers total 0.76 weight percent.
[b] Conditions for aging specimen bars.

None of the compositions containing sodium nitrate passed the horizontal burn test. Since the burning rate was less than 1.5 inches per minute, these were classified as UL94-HB. The presence of sodium nitrate did increase the oxygen indexes of the compositions. Since the samples failed the horizontal burn test, the set of samples aged at 168° C. were not tested.

168 hours at 70° C. were not tested.

EXAMPLE V

This example illustrates the results obtained with poly(alkylene terephthalate) as the resinous component. The procedure and materials of Example I were used with a poly(alkylene terephthalate) substituted for the polypropylene. The poly(butylene terephthalate) obtained from Eastern Chemical Products was designated Tenite Polyterephthalate 6P4DF and had an intrinsic viscosity of 1.09. The poly(ethylene terephthalate) was obtained from Goodyear Tire and Rubber Company with a designation 5041 and an intrinsic viscosity of 1.0. The poly(butylene terephthalate) compositions were readily extruded. However, a composition of poly(ethylene terephthalate) and 10 weight percent tetrabromophthalic anhydride could not be extruded in that not enough back pressure could be developed.

If the flame times for the 23° C. specimens were greater than 30 seconds, the flame times for the 70° C. specimens were not determined.

EXAMPLE VI

This example illustrates that polyethylene cannot be rendered flame resistant with the components useful for polypropylene. The procedure and materials of Example I were used except that the polypropylene was replaced with high density polyethylene having a melt index of 0.5–1.0 as determined by ASTM D-1238 condi- Table V

| Composition[a] | | | | | | | |
|---|---|---|---|---|---|---|---|
| PBT | 99.2 | 89.2 | 97.2 | 87.2 | 87 | 80.9 | 74.8 |
| TBPA | — | 10 | — | 10 | 10 | 15 | 20 |
| APP | — | — | 2 | 2 | 2 | 3 | 4 |
| NH$_4$NO$_3$ | — | — | — | — | 0.2 | 0.3 | 0.4 |
| Results after 48 hrs. @23° C.[b] | | | | | | | |
| Avg. Flame Time (sec.) | | | | | | | |
| First Ignition | >30 | >30 | >30 | >30 | 10 | 6 | 0 |
| Second Ignition | | | | | 2 | 1 | 3 |
| Glow Time (sec.) | | | | | 0 | 0 | 0 |
| Horizontal Burn | | | | | Fail | Pass | Pass |
| Results after 168 hrs. @at C.[b] | | | | | | | |
| Avg. Flame Time (sec.) | | | | | | | |
| First Ignition | | | | | | 0 | 0 |
| Second Ignition | | | | | | 6 | 2 |
| Glow Time (sec.) | | | | | | 0 | 0 |
| Rating | UL94-HB | UL94-HB | UL94-HB | UL94-HB | UL94-HB | UL94-V2 | UL94-V2 |

[a]Values are weight percent based on total composition; PBT is poly(butylene terephthalate); TBPA is tetrabromophthalic anhydride; APP is ammonium polyphosphate; stabilizers total 0.76 weight percent.
[b]Conditions for aging specimen bars.

In comparing the results in Table V with those of Table I, it can be seen that with poly(butylene terephalate) compositions higher concentrations of tetrabromophthalic anhydride, ammonium polyphosphate and ammonium nitrate are required to give a UL94V-2 rating than with polypropylene compositions. Although the composition containing 0.2 weight percent ammonium nitrate in Table V did not pass the horizontal burn test, the flame time was lower than with the compositions which did not contain ammonium nitrate.

tion E. A polyethylene composition containing 10 weight percent tetrabromophthalic anhydride, 2 weight percent ammonium polyphosphate and 1 weight percent ammonium nitrate foamed and spit during extrusion. A composition in which the ammonium nitrate level was reduced to 0.4 weight percent was extruded without difficulty. The results of the UL94 test are given in Table VI.

Table VI

| Composition[a] | | | | | | | | |
|---|---|---|---|---|---|---|---|---|
| PE | 99.2 | 89.2 | 97.2 | 87.2 | 89 | 87 | 80.9 | 74.8 |
| TBPA | — | 10 | — | 10 | 10 | 10 | 15 | 20 |
| APP | — | — | 2 | 2 | — | 2 | 3 | 4 |
| NH$_4$NO$_3$ | — | — | — | — | 0.2 | 0.2 | 0.3 | 0.4 |
| Results after 48 hrs. @23° C.[b] | | | | | | | | |
| Avg. Flame Time (sec.) | | | | | | | | |
| 1st Ignition | >30 | >30 | >30 | >30 | >30 | >30 | 1 | 0 |
| 2nd Ignition | | | | | | | >30 | >30 |
| Glow Time (sec.) | | | | | | | | |
| Horizontal Burn | Fail | Fail | | | Fail | Fail | Pass | Fail |
| Results after 168 hr. @70° C.[b] | | | | | | | | |
| Avg. Flame Time (sec.) | | | | | | | | |
| 1st Ignition | >30 | >30 | | | >30 | >30 | | 0 |
| 2nd Ignition | | | | | | | | >30 |
| Glow time (sec) | | | | | | | | |
| Rating | UL94-HB | UL94-HB | UL94-HB | UL94-HB | UL94-HB | UL94-HB | UL94-HB | UL94-HB |

[a]Values are weight percent based on total composition; PE is polyethylene; TBPA is tetrabromophthalic anhydride; APP is ammonium polyphosphate; stabilizers total 0.76 weight percent.
[b]Conditions for aging specimen bars.

As shown in Table VI, all of the compositions containing polyethylene failed the flame time test and or the horizontal burn test. Even levels of 20 weight percent tetrabromophthalic anhydride, 4 weight percent ammonium polyphosphate and 0.4 weight percent ammonium nitrate did not give a composition that could be classified as UL94V-2.

We claim:

1. A flame retardant composition comprising a resinous polymer chosen from the group consisting of a resinous polymer of propylene, a resinous polymer of styrene, and a resinous poly(alkylene terephthalate); a primary flame retardant comprising a chlorine or bromine containing organic compound; ammonium polyphosphate; and ammonium nitrate.

2. The composition of claim 1 wherein said resinous polymer is a resinous polymer of propylene containing at least 75 weight percent propylene.

3. The composition of claim 2 wherein said chlorine or bromine containing organic compound is tetrabromophthalic anhydride.

4. The composition of claim 2 wherein said ammonium polyphosphate is present in a concentration of from 1 to 5 weight percent of the composition.

5. The composition of claim 2 wherein said ammonium nitrate is present in a concentration of from 0.1 to 4 weight percent of the composition.

6. The composition of claim 1 wherein said poly(alkylene terephthalate) is homo-poly(butylene terephthalate) or homo-poly (ethylene terephthalate).

7. A flame retardant composition comprising at least 40 weight percent of a substantially crystalline resinous polymer of propylene containing at least 75 weight percent propylene; from 5 to 15 weight percent tetrabromophthalic anhydride; from 1 to 5 weight percent ammonium polyphosphate; and from 0.1 to 3 weight percent ammonium nitrate.

* * * * *

UNITED STATES PATENT OFFICE
CERTIFICATE OF CORRECTION

Patent No. 4,165,309  Dated  August 21, 1979

Inventor(s) Ivor R. Fielding, Wassily Poppe, and Francis J. Slama

It is certified that error appears in the above-identified patent and that said Letters Patent are hereby corrected as shown below:

| Column | Line | |
|--------|------|--|
| 3 | 32 | "decarbromophenoxybenzene" should be --decabromophenoxybenzene-- |
| 9 | 26 | @ at $C^b$" should be --@ $70°C^b$-- |
| 12 | 14 | "40 weight percent" should be --50 weight percent-- |

Signed and Sealed this

Eighteenth Day of December 1979

[SEAL]

Attest:

Attesting Officer

SIDNEY A. DIAMOND

Commissioner of Patents and Trademarks